UNITED STATES PATENT OFFICE.

ALFRED EINHORN, OF MUNICH, GERMANY, ASSIGNOR TO FARBWERKE VORM. MEISTER LUCIUS & BRÜNING, OF HÖCHST-ON-THE-MAIN, GERMANY, A CORPORATION OF GERMANY.

ALKAMIN ESTERS OF PARA-AMINOBENZOIC ACID.

No. 812,554.     Specification of Letters Patent.     Patented Feb. 13, 1906.

Application filed November 8, 1905. Serial No. 286,380.

*To all whom it may concern:*

Be it known that I, ALFRED EINHORN, Dr. Rer. Nat., professor of chemistry, a citizen of the Empire of Germany, residing at Munich, Germany, have invented certain new and useful Improvements in the Preparation of Alkamin Esters of Para-Aminobenzoic Acid, of which the following is a specification.

I have found that the alkamin esters of para-aminobenzoic acid may be obtained by reducing the alkamin esters of para-nitrobenzoic acid. The compounds thus obtained, hitherto unknown, are valuable for medicinal purposes as local anesthetics.

The alkamin esters of para-aminobenzoic acid are colorless compounds, little soluble in water, of a low melting-point, readily soluble in alcohol, ether, and benzene and of alkaline reaction on litmus. The said esters form salts readily soluble in water to a neutral solution. On heating with acids or alkalies the alkamin esters of para-aminobenzoic acid are decomposed with formation of para-aminobenzoic aicd and an alkamin. These esters have the property of producing local anæsthesia, and this property is not associated in their neutral reacting hydrochlorids with any irritating effect. To prepare the said new esters of alkamins, the process may be carried out, for instance, as follows: Ten parts, by weight, of para-nitrobenzoyldiethylaminoethanol, which, for instance, may be obtained by heating for one day to 100° to 120° centigrade para-nitrobenzoylchloroethanol (obtained by heating ethylene chlorhydrin with para-nitrobenzoylchlorid) with ten parts, by weight, of diethylamin, being an oil readily soluble in ether and solidifying in the cold, are allowed to digest at a moderate temperature with thirteen parts, by weight, of tin and twenty-five parts, by weight, of concentrated hydrochloric acid. From the colorless solution thus obtained the tin is precipitated by means of hydrogen sulfid, and on addition of sodium carbonate the para-aminobenzoyldiethylaminoethanol is separated as an oil which soon solidifies. This alkamin ester crystallizes from dilute alcohol as white needles, melting at 51° centigrade. With one equivalent of hydrochloric acid it forms a hydrochlorid, readily soluble in water with a neutral reaction and crystallizing from absolute alcohol in needles melting at 156° centigrade.

In an analogous or different manner other alkamin esters of para-aminobenzoic acid may be obtained.

Having now described my invention, what I claim is—

1. As new products, the alkamin esters of para-aminobenzoic acid, being colorless compounds, little soluble in water, but readily soluble in alcohol, ether and benzene, of alkaline reaction on litmus, decomposed when heated with acids or alkalies with formation of para-aminobenzoic acid and an alkamin, forming salts soluble in water to a neutral solution which produces local anæsthesia without causing any irritation.

2. As a new product, the alkamin ester para-aminobenzoyldiethylaminoethanol being a colorless compound very little soluble in water, very readily soluble in alcohol, ether and benzene, solidifying in the cold and of alkaline reaction on litmus, decomposed, when heated with hydrochloric acid or soda-lye, into para-aminobenzoic acid and diethyl-aminoethanol, forming a salt with one equivalent of hydrochloric acid which crystallizes from absolute alcohol in needles melting at 156° centigrade the solution of which is of anesthetic action without causing irritation.

In testimony that I claim the foregoing as my invention I have signed my name in presence of two subscribing witnesses.

ALFRED EINHORN.

Witnesses:
ULYSSES J. BYWATER,
MATHILDE K. HELD.